United States Patent
Mathis et al.

(10) Patent No.: US 7,732,752 B2
(45) Date of Patent: Jun. 8, 2010

(54) CONTINUOUS BASE BENEATH OPTICAL SENSOR AND OPTICAL HOMODYNING SYSTEM

(75) Inventors: Olivier Mathis, Grimisuat (CH); Neil O'Connell, Corks (IE); Olivier Theytaz, Savigny (CH); Peter Sheehan, New Castle (IE); Dennis O'Keeffe, Newmarket (IE); Yves Salvade, St. Imier (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 18 days.

(21) Appl. No.: 11/240,869

(22) Filed: Sep. 29, 2005

(65) Prior Publication Data

US 2006/0131487 A1 Jun. 22, 2006

Related U.S. Application Data

(60) Provisional application No. 60/615,450, filed on Sep. 30, 2004.

(51) Int. Cl.
*G06M 7/00* (2006.01)
(52) U.S. Cl. .................. 250/221; 345/166; 345/163; 356/28; 356/400
(58) Field of Classification Search .................. 345/163, 345/166; 250/221; 356/28, 400, 493, 505
See application file for complete search history.

(56) References Cited

U.S. PATENT DOCUMENTS

| 6,084,574 | A  | * | 7/2000 | Bidiville | 345/166 |
| 6,281,882 | B1 |   | 8/2001 | Gordon et al. | |
| 6,421,045 | B1 |   | 7/2002 | Venkat et al. | |
| 6,741,335 | B2 | * | 5/2004 | Kinrot et al. | 356/28 |
| 7,009,598 | B1 | * | 3/2006 | Bohn | 345/166 |
| 2003/0098852 | A1 | | 5/2003 | Huang et al. | |
| 2004/0084610 | A1 | | 5/2004 | Leong et al. | |
| 2005/0035947 | A1 | | 2/2005 | Lutian | |
| 2005/0179662 | A1 | | 8/2005 | Gordon et al. | |

(Continued)

FOREIGN PATENT DOCUMENTS

JP 11272417 A 10/1999

(Continued)

OTHER PUBLICATIONS transparent. (2003). In The American Heritage® Dictionary of the English Language. Retrieved Mar. 7, 2007, from http://www.xreferplus.com/entry/4141572.*

(Continued)

*Primary Examiner*—Seung C Sohn
(74) *Attorney, Agent, or Firm*—The Law Offices of Deepti Panchawagh-Jain

(57) ABSTRACT

A housing for a control device includes an enclosed cavity configured to secure an optical detection system, including a light source and a sensor, and a face of the enclosed cavity configured to include a window to allow light from the light source to scatter light off of a surface and configured to allow reception of the scattered light on the sensor. In this configuration the housing is structured to prevent exposure of the optical detection system to external elements such as the surface. Also disclosed is a homodyning system for use with a coherent light source optical pointing device.

24 Claims, 12 Drawing Sheets

U.S. PATENT DOCUMENTS

2005/0206617 A1* 9/2005 Moyer et al. ............... 345/163
2006/0091298 A1* 5/2006 Xie et al. .................. 250/221
2006/0279545 A1* 12/2006 Lan et al. .................. 345/166

FOREIGN PATENT DOCUMENTS

WO  WO 03/025658 A1  3/2003
WO  2006/092665 A2  9/2006

OTHER PUBLICATIONS

International Search Report and Written Opinion, PCT/IB2005/004072, Oct. 25, 2006, 10 pages.
International Preliminary Report on Patentability for PCT Patent Application No. PCT/IB2005/004072, mailed on Apr. 12, 2007, 9.
Office Action Recieved for German Patent Application No. 112005002463.6, mailed on Mar. 4, 2004, 4.
Office Action Recieved for German Patent Application No. 112005002463.6, mailed on Jul. 8, 2008, 4.
"Office Action Received for Chinese Patent Application No. 200580033262.7, mailed on Jun. 27, 2008", 3 pages.
"Office Action Received for German Patent Application No. 112005002463.6, mailed on Feb. 26, 2009", 3 pages.
Office Action Received for Chinese Patent Application No. 200580033262.7, mailed on Feb. 24, 2010, 2 pages of English Translation.

* cited by examiner

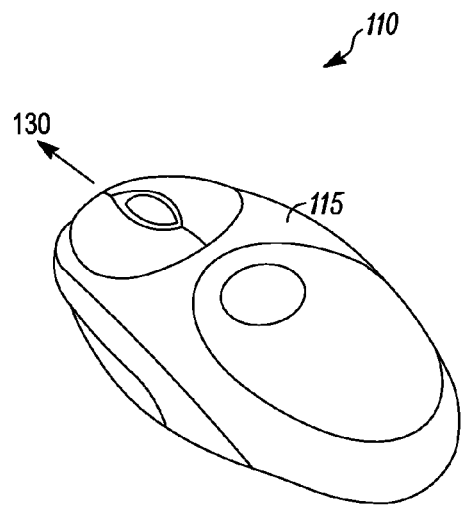
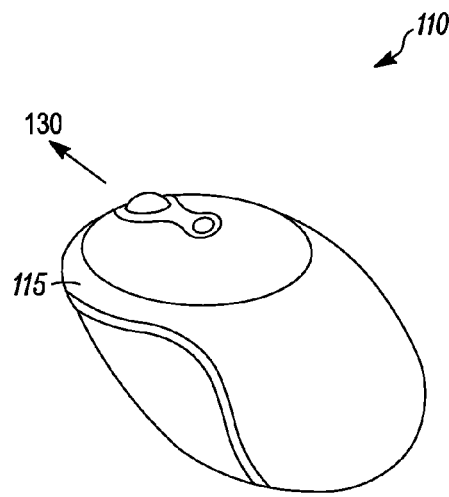
FIG. 1A  FIG. 1B
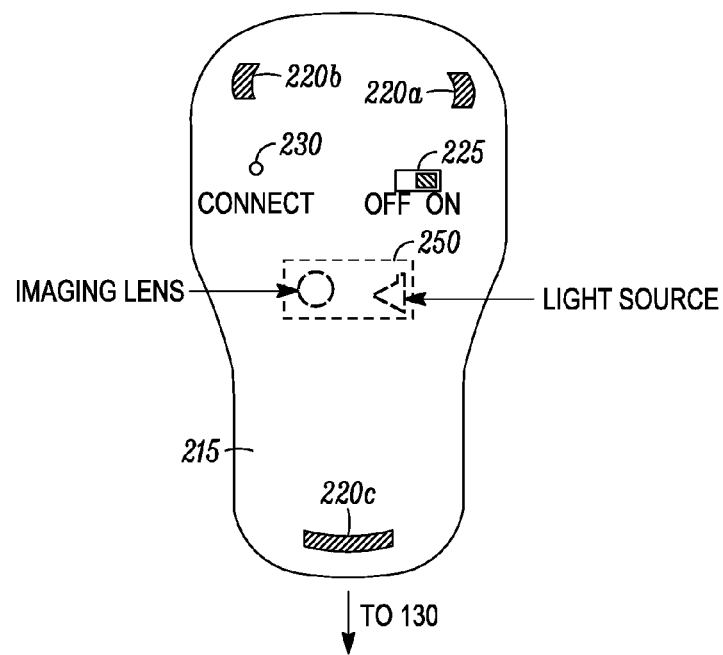
FIG. 2

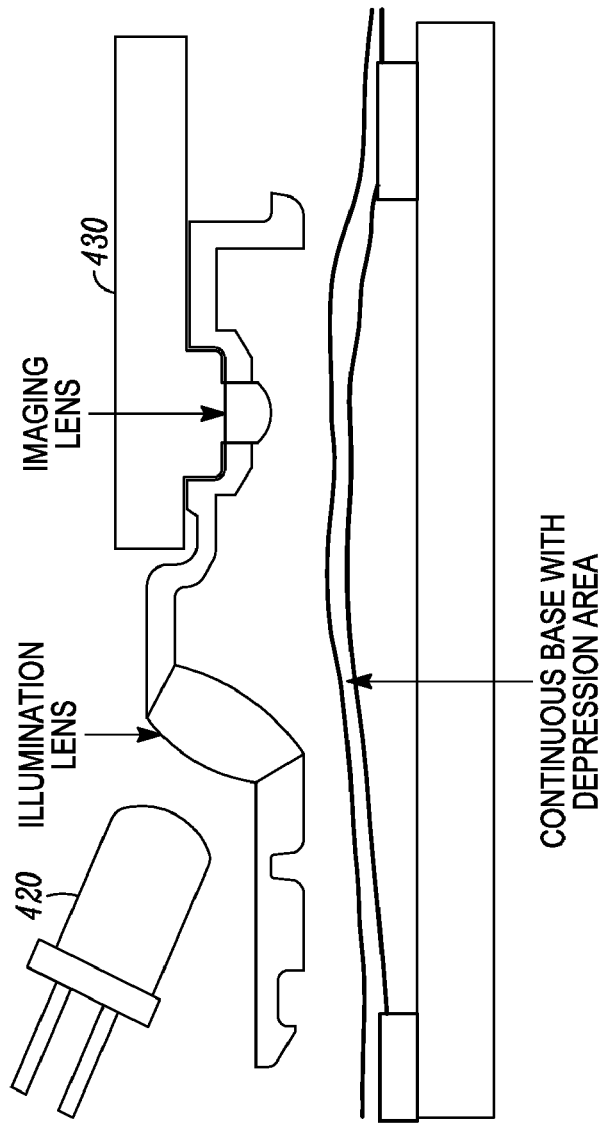

CONTINUOUS BASE BENEATH OPTICAL SENSOR AND OPTICAL HOMODYNING SYSTEM

RELATED APPLICATIONS

This application claims a benefit of, and priority under 35 USC §119(e) to, U.S. Provisional Patent Application No. 60/615,450, filed Sep. 30, 2004, titled "Continuous Base Beneath Optical Sensor and Optical Homodyning System", the contents of which are herein incorporated by reference.

BACKGROUND OF THE INVENTION

1. Field of the Invention

The present invention relates generally to optical control devices, and more particularly, to structures for optical control devices.

2. Description of the Related Art

Displacement detection based on optical technology is used in several applications, including optical input devices for computer systems. Data processing systems, or computer systems generally, are used in conjunction with a variety of input devices, such as, keyboards, pointing devices (e.g., mice, touchpads, and trackballs), joysticks, digital pens, and the like.

One example of optical displacement detection technology used in a pointing device is an optical mouse. Examples of pointing devices using optical detection technology and their operation are described in U.S. Pat. No. 5,288,993 to Bidiville, et al. (issued Feb. 22, 1994) entitled "Cursor Pointing Device Utilizing a Photodetector Array with Target Ball Having Randomly Distributed Speckles" and U.S. Pat. No. 5,703,356 to Bidiville, et al. (issued on Dec. 30, 1997) entitled "Pointing Device Utilizing a Photodetector Array," the relevant portions of which are incorporated herein by reference.

There are significant advantages to using optical input devices over other types of input devices, such as, mechanical or opto-mechanical input devices. For example, mechanical or opto-mechanical input devices have mechanical components that are more susceptible to breakdown, wear, or clogging. Optical input devices reduce, and in some instances eliminate, a number of mechanical parts susceptible to these problems. Instead, optical input devices are manufactured with solid-state components that are less susceptible to such breakdown, dirt, or wear.

Optical displacement detection systems use differences in images captured over short periods of time to detect displacement and derive movement of a device relative to a surface. In general, a first image of a surface is captured at a first time and is compared with a second image captured shortly after the first image. The changes in the images over a small period of time correspond to displacement of the systems with respect to features of the surface. This displacement information is processed to derive movement data, such as, movement associated with a user display. For example, an optical pointing device in the form of a mouse captures images of a desk surface, and in the case of trackball, of a ball, providing displacement data of features on the surface that is processed to derive movement of a cursor in a computer screen.

A conventional optical displacement detection system, or optical system in general, includes a conventional illumination subsystem and a conventional optical sensor or detection subsystem. The conventional illumination subsystem includes a conventional illumination lens and a conventional source of electromagnetic energy or light source. Typically, the light source is a type of light emitting diode (LED). Generally, the light source is attached to a printed circuit board (PCB) and positioned with respect to the illumination lens to direct light through an opening on a bottom of the optical mouse onto an illumination spot on a surface (e.g., a desk).

The conventional sensor subsystem includes an imaging lens and a sensor. The sensor typically includes an image-capturing module, for example, one or more photosensor arrays. Some sensors also include controller circuitry associated with the image-capturing module, for example, in the form of digital circuits in the same die or device package. Generally, the controller circuitry performs digital signal processing (DSP) to derive movement data from the captured images. The sensor assembly is also typically mounted on the PCB and positioned so that the imaging lens optimally captures the electromagnetic energy (e.g., light) scattered from (or reflected off) the surface.

The sensor receives the scattered light from the imaged area through the opening at the bottom of the optical mouse. Thereafter, the sensor analyzes the images scanned or taken off the surface to provide displacement information. The imaged area substantially overlaps with the illumination so that the light is efficiently used to illuminate only that area of the surface that is imaged or scanned by the sensor.

As noted above, the solid state architecture of the conventional optical mouse allows for less structural wear and tear, which increases product life, while also allowing for relative ease of manufacturing, which decreases production costs. However, a conventional optical mouse may be susceptible to the entry of foreign elements into the housing through the opening at a bottom of the optical mouse. Examples of foreign elements include dust, liquids, and electrostatic discharge, all of which can damage components in the optical mouse. In turn, these foreign elements decrease reliability of the optical mouse, e.g., reducing photosensitivity, or causing the optical mouse to malfunction altogether, e.g., shorting the solid-state components.

Hence, there is a need for an optical mouse with a continuous or flush bottom (or base) that still provides characteristics of emitting light from the optical mouse while minimally impacting the intensity of the scattered light off of a surface back into the optical mouse.

SUMMARY OF THE INVENTION

The present invention includes a housing for a control device. The housing includes an enclosed cavity configured to secure an optical detection system. The optical detection system includes a light source and a sensor. The housing also includes a face of the enclosed cavity. The face of the enclosed cavity is configured to include a window that allows light from the light source to scatter (or reflect) off of a surface and also allows reception of that scattered light on the sensor. In this configuration the housing is structured to prevent exposure of the optical detection system within the cavity to external elements such as the surface. The system may also be configured to prevent scratching of the area through which light is shone and scattered back.

In one embodiment, the control device comprises an optical pointing device. The optical pointing device includes an optical detection system and a housing. The optical detection system includes a light source and a sensor. The housing includes an internal cavity and at least one bottom face.

The internal cavity is configured to secure the optical detection system either directly or indirectly, e.g., through securing a printed circuit board that couples (or hosts) the optical detection system. The bottom face includes a window configured to allow light from the light source to scatter off of a surface and configured to allow reception of the scattered light on the sensor. The bottom face of the housing is structured to prevent exposure of the optical detection system to the surface as noted above.

Advantages of embodiments of the present invention including fully encasing an optical detection system within a housing of a control device to limit or prevent exposure of the optical detection system to an external environment. This decreases the opportunity for foreign elements (e.g., dust, liquid, electrostatic discharge, extraneous light etc.) to be introduced into the optical detection system, thereby eliminating factors that may decrease system reliability or cause system malfunction. Moreover, limiting or eliminating exposure of the optical detection system to an external environment beneficially provides a control device having functionality in rugged environments typically not suitable for conventional control devices such as high moisture or high environmental particle exposure environments.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 1a and 1b illustrates embodiments of an optical control device in accordance with the present invention.

FIG. 2 illustrates an embodiment of an underside (or base or bottom surface) of an optical control device in accordance with the present invention.

FIG. 4c illustrates a continuous base of an optical pointing device with a base depression in accordance with the present invention.

DETAILED DESCRIPTION OF THE PREFERRED EMBODIMENTS

Figure 3A:
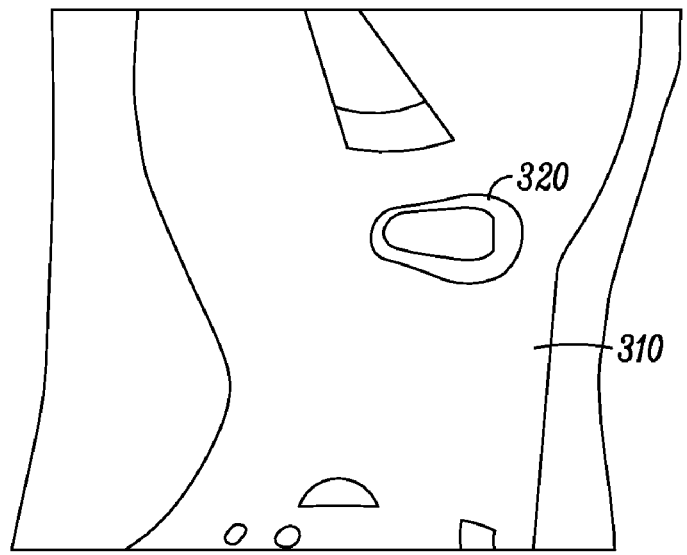
FIGS. 3a and 3b illustrate an embodiment of a window on an underside of an optical control device in accordance with the present invention.

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

General Architecture

The present invention Figures (FIGS.) 1a and 1b illustrates embodiments of example optical control devices 110 in accordance with the present invention. In particular, FIGS. 1a and 1b illustrate a top surface 115 of the optical control device 110, typically where a user would place his hand to control the device. The optical control device 10 is configured to communicate, through a wired or wireless connection, with a host system 130 (not shown).

It is noted that the descriptions herein are provided with respect to the optical control device 110, e.g., an optical mouse, for ease of discussion and understanding. However, the principles disclosed herein are applicable to other configurations of an optical control device, for example, an optical trackball, remote control, digital pen, or presenter device (e.g., Logitech® Cordless Presenter™). In addition, the host system 130 can be any host system having instruction and command processing functionality, which includes a display with which the optical control device 110 interacts, for example, a computer system, an entertainment system, a gaming system, a set top box, or the like.

FIG. 2 illustrates an embodiment of a base 215 (or underside or bottom surface) of the optical control device 110 in accordance with the present invention. The base 215 of the optical control device 110 includes optional feet 220a-c (generally 220), optional operational (e.g., on-off) button 225, an optional connect button 230, and an optical window (or window) 250.

The feet 220 couple, e.g., glued or otherwise attached, with the base 215 or may be integrated, e.g., as raised portions, with the base 215. The feet 220 provide less frictional, or frictionless, contact elements with respect a surface on which the optical control device 110 can move across and allow the base 215 to be slightly raised off of the surface. Note that the surface can be any surface, for example, a table, a fabric, or a hand or leg. The optional operational button 225 is configured to turn on or off power to components within an internal cavity (or housing) of wireless configurations of the optical control device 110. The connect button 230 and the operational button 225 may be configured as switches or as buttons. Moreover, they may be configured to further seal the base 215, e.g., as membrane or solid-state buttons.

The optical window 250 is an area through which light from one or more light sources exits the cavity of the housing of the optical control device 110 onto the surface, e.g., onto a lighted area or illumination spot. The window 250 also serves to allow light scattered off of a surface to enter back into the cavity of the housing of the optical control device 110, and more particularly, captured through one or more imaging lenses onto a one or more photosensor arrays (or sensors or photosensors).

Unlike conventional optical control devices, the window 250 is configured so that there is no opening on the base 215 of the optical control device 110. Rather, the window may be integrated within the base 215. Alternatively, the window 250 may be configured to couple with an opening in the base. When coupled, the window 250 and the base 215 are tightly coupled, the window 250 and the base may be heat fused, glued, rubber sealed, or the like. In either configuration, the window 250 area is configured to seal the inside of the cavity of the housing from the external area.

Figure 3B:
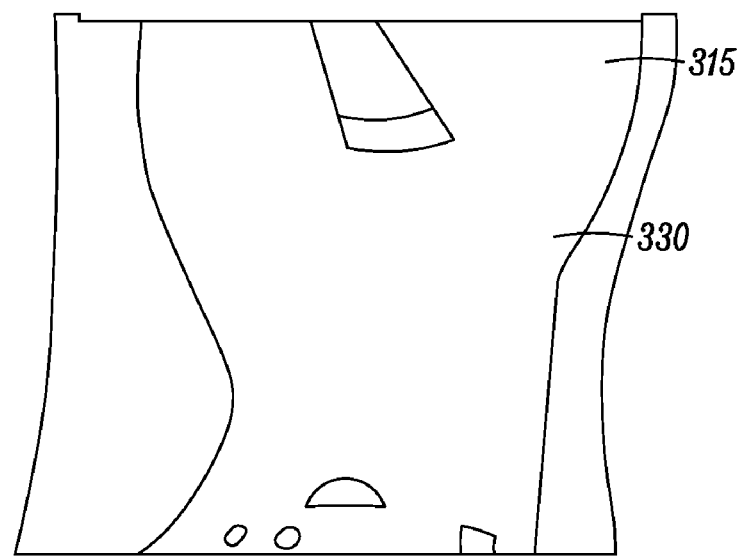

FIGS. 3a and 3b illustrate embodiments of a base 310, 315 of an optical control device, e.g., 110, in accordance with the present invention. In FIG. 3a a base 310 includes a window area 320 that is visible from a surface view. The window area 320 is configured to allow either coherent or non-coherent light from within a cavity (or internal portion of a housing) of the control device 110 to be transmitted through for scattering (or reflecting) off of a surface. In one embodiment, the transmitted light is infrared light from an infrared light source so the window area 320 is darkened. In other embodiments, the transmitted light is a red light emitting diode or laser so that the window area may be translucent or red. Likewise the windowed area can be configured to appropriately complement the light source used. Further, the window area 320 is configured so that light scattered off of a surface can be received back into the cavity as further described below. The window area 310 may be made materials such as glass, plastic, or other polymer.

In FIG. 3b, the window area 330 is not apparent from a surface view as it is blended in with a second embodiment of a base 315 of the optical control device 10. In this embodiment, the base may be configured of a glass, plastic or other polymer such that coherent or non-coherent light from within the cavity of the optical control device 110 can be emitted out onto a surface. In addition, the window area 330 is configured such that scattered light can be received back into the cavity as further described below.

Figure 4A:
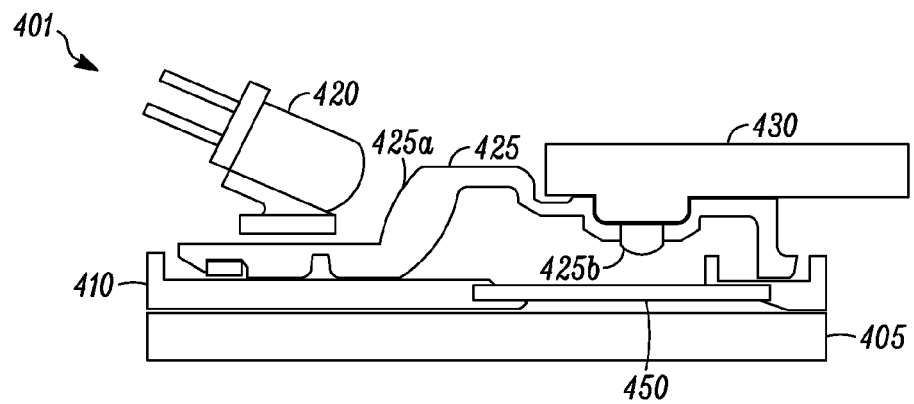
FIG. 4a illustrates an embodiment of an internal of an optical detection system with a first window configuration in accordance with the present invention.

FIG. 4a illustrates an embodiment of internal components of an optical detection system 401 with a first window configuration in accordance with the present invention. The optical detection system 401 may be configured for use in an optical control device, e.g., 110, and would reside within a housing (or a cavity of) the optical control device 110. The optical detection system 401 may be configured with a printed circuit board (not shown), also within the housing of the optical control device 110.

The base 110 of the housing of the optical control device 110 is configured to abut against a surface 405. In one embodiment, the base 110 also includes a window 450. In this embodiment, the window 450 may be visible from an external view of the base, for example, similar to the window 320 illustrated in FIG. 3a.

The optical detection system 401 includes a light source assembly 420, a lens system (which may include one or more optical lenses) 425, and one or more sensors (e.g., photosensors) 430. The light source assembly 420 may include a light source and optionally corresponding mechanical components, e.g., a clip, or attributes, e.g., fabricated configuration relative to other manufactured parts for securing within the optical pointing device. The light source may be a non-coherent, e.g., light emitting diode (LED), or coherent, e.g., laser or VCSEL, light source.

The lens system 425 includes an illumination lens 425a configured to collect and direct light from the light source through the window 450 on the base 410 of the optical control device 110 and onto the surface 450. The lens system 425 also includes an imaging lens 425b configured to image onto the sensor 430 light from the light source that is reflected, or scattered, off of the surface 405 and through the window 450. Examples of an illumination lens and an imaging lens are provided in U.S. patent application Ser. No. 10/826,424 (entitled "Multi-Light-Source Illumination System for Optical Pointing Devices") and U.S. patent application Ser. No. 10/033,427 (entitled "Illumination Refractive System"), the contents of which are incorporated by reference.

Figure 4B:
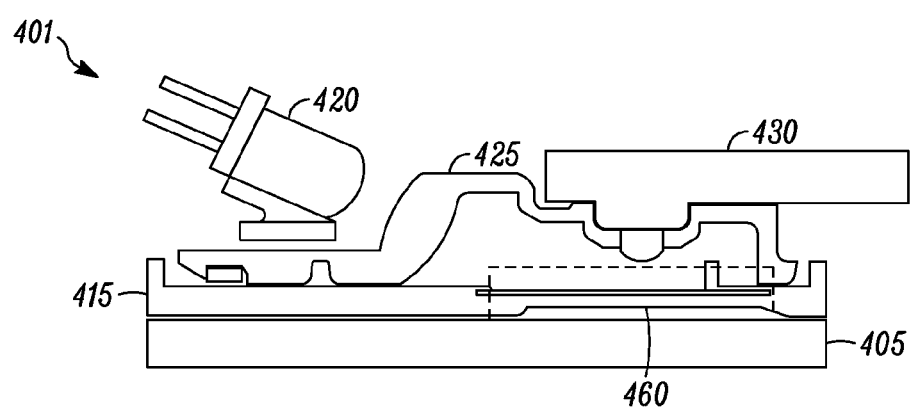
FIG. 4b illustrates an embodiment of an internal of an optical detection system with a second window configuration in accordance with the present invention.

FIG. 4b illustrates an alternative embodiment of internal components of an optical detection system 401 with a second window configuration in accordance with the present invention. In this embodiment, a window 460 is integrated with a base 415 of a housing of the optical control device 110. Note that the window may not be readily apparent from an external view of a surface of the base 415, for example, as illustrated by the window area 330 in FIG. 3b. Further, in one embodiment the window 460 may be a window area where light from the illumination lens 425a leaves the cavity onto the surface 405 and where light scattered from the surface 405 is received for the imaging lens 425b to focus an image of the surface on the sensor 430.

In one embodiment, the windows (or window area) described in FIGS. 3a through 4b may have a thickness of 0.5 millimeters (mm) to 1.0 mm. However, window thickness may also be varied based on sensor characteristics, distances to a surface from the various components, and window characteristics such as material density and optical properties. Simulation programs such as Zemax provide tools to enter in this data to determine appropriate window thickness. For example, an optical simulation program may be configured to adjust the optical dimensions along the optical axis to take into account the effect of the window to increase the distance between the table and the lens or to position or adjust a light source. Alternatively, other parameters can be altered if window thickness is known, for example, distance of a sensor and/or light source in relation to the surface.

FIG. 4c illustrates an embodiment of a continuous base (e.g., unibody construction base) of an optical pointing device with a base depression (or recessed area) in accordance with the present invention. Specifically, the base depression is part of the base itself and provides a window for light emitted from within, e.g., from the light source, or for light entering into the cavity, e.g., for the sensor 430. In this embodiment the continuous base comprises a unibody structure, e.g., constructed from a single injection (or injection molded part). The base depression may be configured to be subtle or may be configured to be more pronounced. In either instance, the window area is raised above a surface to keep the area relatively scratch-free and clean.

Further, in one embodiment a portion of the case below the imaging lens is clear and optically flat (e.g., a 3 millimeter diameter) beneath the imaging lens. In an alternative embodiment, the base depression of the continuous base also may be configured to add an internal texture and/or structure, which provide an optical function to homogenize an illumination beam (emitted light).

Figure 5A:
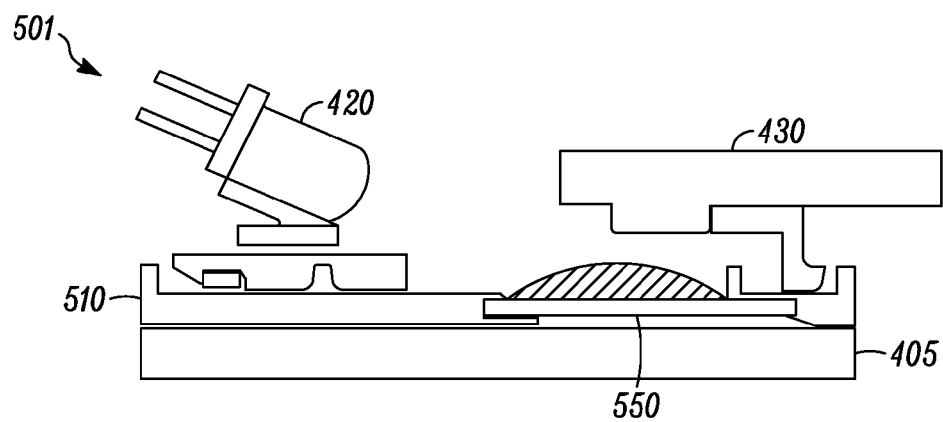
FIGS. 5a and 5b illustrate example alternative embodiments for a window configuration in accordance with the present invention.
Figure 5B:
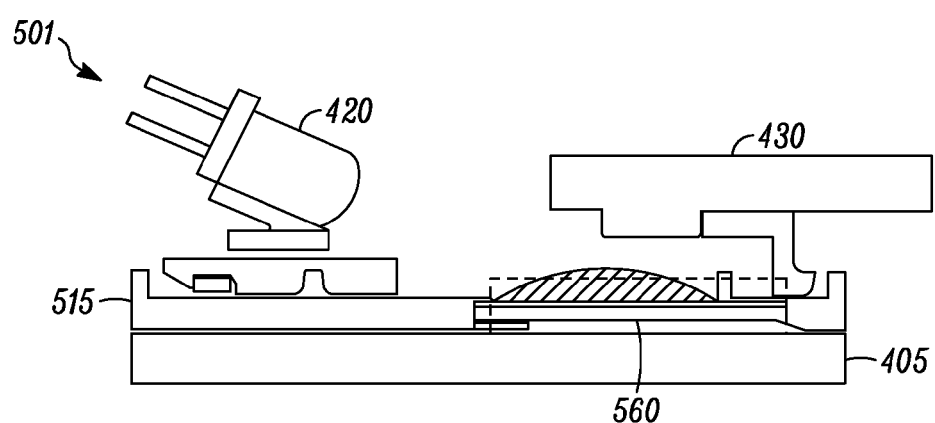
Figure 5C:
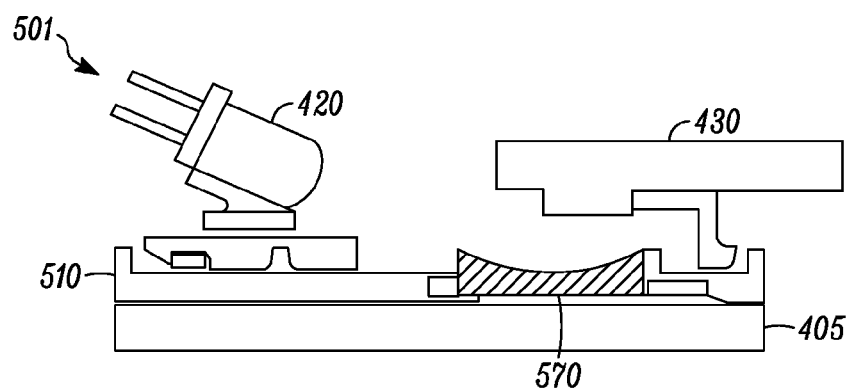
FIGS. 5c and 5d illustrate additional example alternative embodiments for a window configuration in accordance with the present invention.

FIGS. 5a and 5b illustrates example alternative embodiments for a window configuration in accordance with the present invention. In both embodiments an optical detection system 501 includes the light source assembly 420 and the sensor 430 as described above; however the lens system is now eliminated in whole (as shown) or in part (not shown; e.g., only the illumination lens 425a or the imaging lens 425b would be present). When integrated into the base 510 of a device, e.g., the optical control device 110, a first embodiment includes a window 550 that includes an integrated lens.

The integrated lens comprises a convex area or volume and is configured to provide functionality of an illumination lens and imaging lens. If only one of the lenses (i.e., illumination or imaging) is present, the integrated lens can be configured to provide the functionality of the non-present lens. For example, in some embodiments a Plano convex lens (instead of window) may improve the performance of the lens than as a replacement. Further, it may be possible to include all the functions of the lenses (illumination and imaging), within a lens molded into the case bottom. In some embodiments, to get a focused image on the sensor with a <10 millimeter (mm) optical path may require two curvature surfaces. In addition to the imaging and illumination lenses, which may be a part of element 425, additional optical functions may be added to the window. For example, there may be combinations that include full optical function as a part of the window, an optical function of imaging/illumination that is distributed between elements 425 and 550, and imaging and illumination functions that are part of both elements 425 and 550.

In a second embodiment as illustrated in FIG. 5*b*, a window or window area 560 also includes an integrated lens, that too may be a convex area or volume configured to replace one or both the illuminating lens or the imaging lens. As with other embodiments in which the window is integrated with a base, an external view of a base 515 in this embodiment would not necessarily readily show the lens integrated with the window area 560.

It is noted that the integrated lens in both the first embodiment of the window 550 and the second embodiment of the window 560 may include more than one lens. Such embodiments appropriately position one or more lenses to allow the illumination effects from the light source 420, through the lens and window onto the surface and position one or more lenses to allow reflected (or scattered) light back through the window and lens and for imaging onto the sensor 430. Again, the appropriate positioning of the light source 420, sensor 430 and lenses in relation to each other can be configured using the parameters described previously and integrated lens parameters (such as radius of curvature, materials, materials, and magnification) with conventional optimization programs such as ZEMAX® from ZEMAX Development Corporation (Bellevue, Wash.).

Embodiments of the present invention provide a number of benefits and advantages. For example, enclosing a bottom portion (or surface exposed portion) of an optical control device housing reduces or prevents introduction of foreign elements from the surface, such as dust or liquids, into the housing itself. This protects sensitive solid-state components such as the optical displacement system, which increases product lifetime and maintains product integrity. In addition, this configuration reduces or eliminates electrostatic discharge effects on the electronic components within the optical control device. In turn, this decreases chances of product malfunction, allows for increased product lifetime, and maintains product integrity.

Figure 5D:
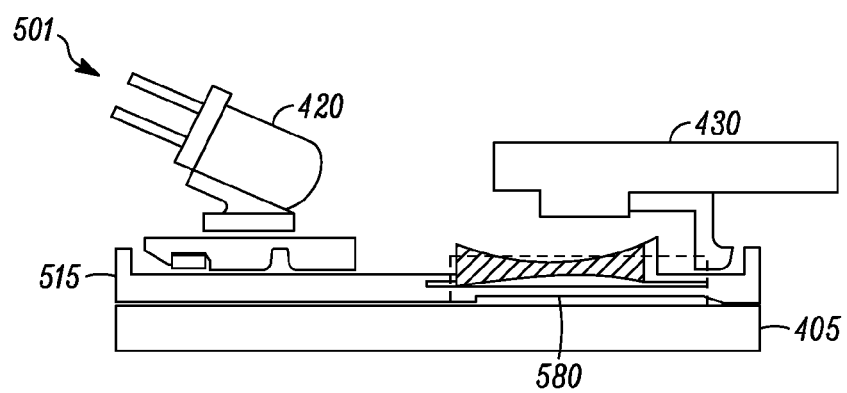

FIG. 5*d* illustrates an additional example alternative embodiment for a window configuration in accordance with the present invention. In this embodiment the window area includes a concave area or volume 570 that may be configured to replace one or both the illuminating lens or the imaging lens. FIG. 5*d* illustrates an additional example alternative embodiment for a window configuration in accordance with the present invention. In this embodiment the window area includes a dual concave area or volume 580 that may be configured to replace one or both the illuminating lens or the imaging lens.

Enhance and/or Alternative Laser Architecture

FIGS. 6 through 8*d* illustrate alternative architectures for an optical control device for use with a coherent light source in accordance with the present invention. A coherent light source includes, for example, a laser or VCSEL (vertical cavity surface emitting laser) or the like.

Figure 6:
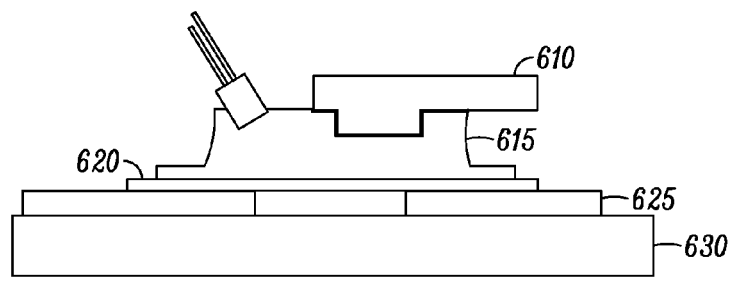
FIG. 6 illustrates an alternative embodiment of an optical control device with a coherent (e.g., laser) light source in accordance with the present invention.

FIG. 6 illustrates an alternative embodiment of an optical control device with a coherent (e.g., laser) light source in accordance with the present invention. This embodiment includes a sensor 610, lens 615, window 620, and base 625. The window 620 is configured to rest in part on the base 625, though alternatively it may be fit within an opening of the base 625. In either configuration the window 620 is raised so that it could avoid direct contact with a rigid surface 630. In one embodiment, this configuration includes a sheet piece of TTV Luxacryl-IR (e.g., 0.5 millimeters ("mm") thick, although other thicknesses may be used such as 0.1 mm to 10 mm thick) laid on a bottom portion of case between a lens 615 and a beam collector (BC) or base. In this embodiment the window is free of dust, scratches and fingerprints. The system can also be raised off of the surface 630, for example, by 0.5 mm.

This configuration advantageously tracks well on surfaces and allows laser power adjustments to occur to take potential window losses into account. Moreover, the optics can be fine tuned to improve performance. Furthermore, the window configuration allows it to remain clean with conventional use, e.g., limited to no dust, scratches or fingerprints on the window because it is somewhat recessed.

Figure 7:
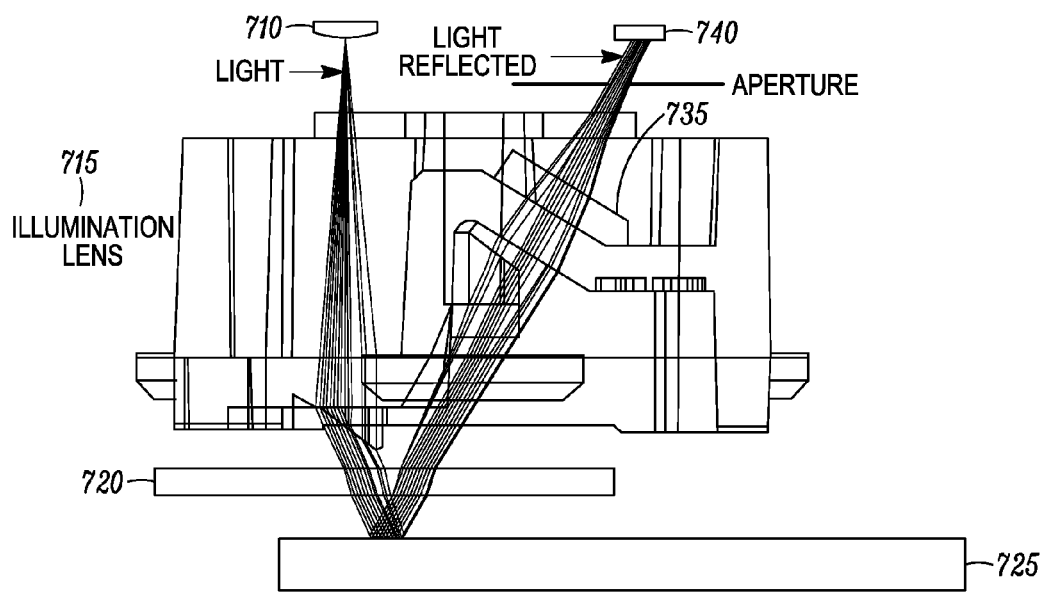
FIG. 7 illustrates a light path for an alternative embodiment of an optical control device with a coherent (e.g., laser) light source in accordance with the present invention.
Figure 8:
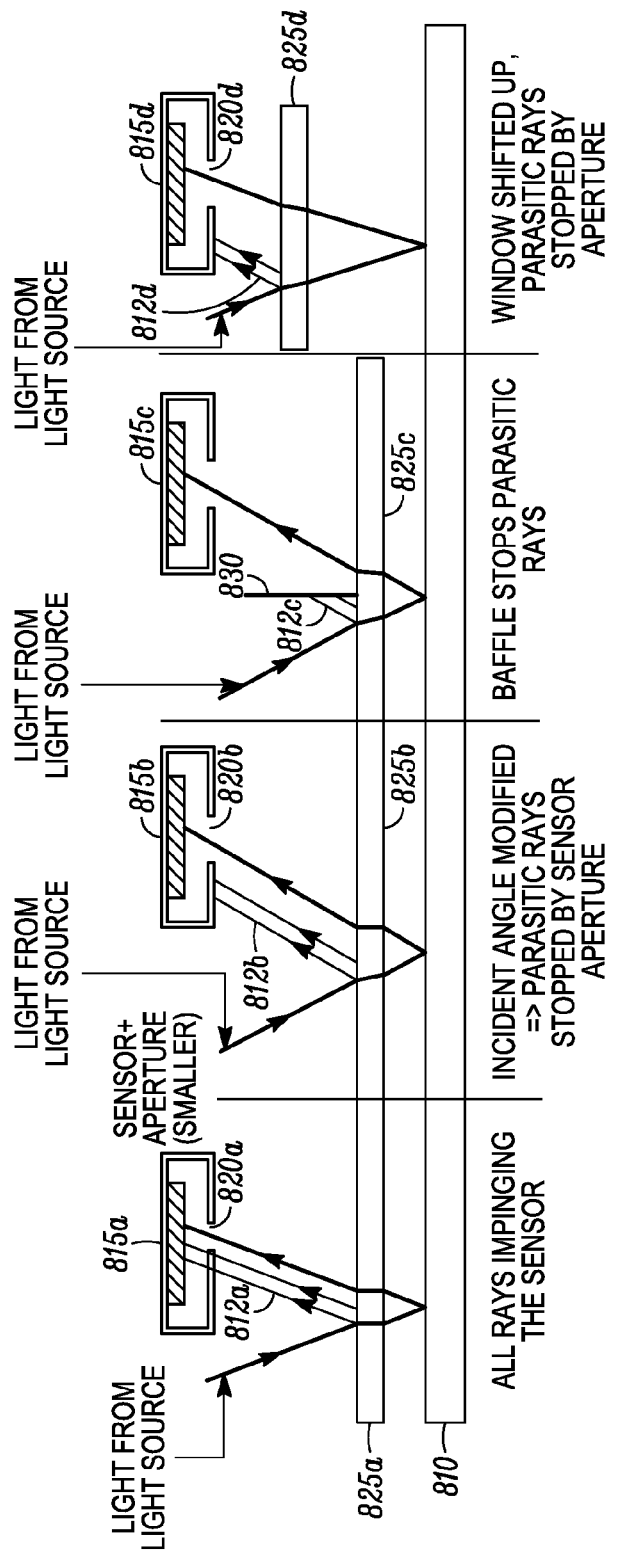
FIGS. 8a through 8d illustrate alternative embodiments of optical paths in view of varied configurations of a windowed area for use in an optical control device in accordance with the present invention.

FIG. 7 illustrates a light path for an alternative embodiment of an optical control device with a coherent (e.g., laser) light source 710 in accordance with the present invention. In this embodiment, light from a light source 710 passes through the illumination lens 715 and window 720, which "directs" the light onto a surface 725. The light may be directed in at any angle from 0 degrees (straight down) to almost 90 degrees, depending on the effect desired, including intensity, power, and the like. The light scattered (or reflected) off the surface 725 comes back through one or more additional lenses (e.g., an imaging lens 735) and onto a sensor 740. There may be an aperture in front of the surface that may limit or further intensify the light on the sensor.

In some embodiments, adding a window in an optical path may generate parasitic light. Moreover, in situations where the window has scratches or fingerprints, parasitic light effects are bigger. FIGS. 8*a* through 8*d* illustrate example alternative embodiments of optical paths in view of varied configurations of a windowed area for use in an optical control device in accordance with the present invention. The illustrations show alternatives for addressing parasitic light. For ease of understanding and explanation, the configurations shown do not illustrate the illumination and imaging lenses, but such lenses would be configured as previously described.

FIG. 8*a* illustrates using a smaller sensor aperture 820*a* so that the parasitic rays 812*a-d* (generally 812) (shown as thin or dotted lines in the Figures) are blocked from the sensor 815*a* after the light from the light-source is reflected off of a surface 810 and passed through window 825*a*. FIG. 8*b* illustrates increasing a distance from the laser, e.g., VCSEL, to the sensor 815*b*. This example modifies an incident angle, which in turn, blocks the parasitic rays 812*b*, not allowing them to pass through sensor aperture 820*b* after the light is reflected off surface 810 and passed through window 825*b*. FIG. 8*c* illustrates incorporating a baffle structure 830. The baffle structure 830 may be configured on the window 825c or on the sensor 815c. The baffle structure 830 is constructed of a material that would block parasitic rays, e.g., a non-translucent or light impermeable material. FIG. 8d illustrates a configuration in which a window 825d through which the light shines and through which light comes back through toward the sensor 815d is shifted up relative to a bottom of a case of the optical pointing device. In this embodiment, the window will be in a recess or the bottom case would have a different form such that parasitic rays 812d off the window 825d are blocked and do not get through the aperture 820d of the sensor 815d.

In yet another embodiment, the window may be treated with an anti-reflective coating that minimizes or eliminates the effects of the parasitic rays. The anti-reflective coating embodiment may also be used in conjunction with the embodiments illustrates in FIGS. 8a through 8d.

In some embodiments of a coherent light (or laser) based system, there may be an illumination spot shift such that a window in the optical path added at nominal design (i.e., no change in design), may cause a spot shift on a surface. In such embodiments, the sensor is no longer looking at full illuminated surface. To address this, embodiments can be configured to raise an optical module (e.g., a lens and light source) in order to compensate this spot shift. Alternatively, there may be a re-design to take into account illumination or there may include using a window as a wedge (e.g., a wedge-like configuration or structure) to put back illumination spot at nominal position.

In embodiments in which an image does not focus at right place, there may have been a change in a focal length of system and, because imaging lens is tilted, a focal point may be off centered. In such embodiments, the optical module (e.g., the lens and light source) may be raised within the system in order to compensate this spot shift, the imaging lens may be redesigned to account for the off centering, or the window may be used as a lens to correct this off centering.

Homodyning System for Laser Architecture

Alternative embodiments of a coherent light (e.g., laser or VCSEL) optical pointing device includes a homodyne system, which takes advantage of parasitic light by using it superimposed with the "normal light coming on sensor" (as a result of being scattered off of the surface. In another alternative embodiment, a system uses a window to provide both mirror and beam splitter functionality.

Referring to a homodyning system, a problem with many conventional LED-based technologies is the low-contrast observed on surfaces such as manila folders, white paper, or other almost whitewashed surfaces. A resulting low quality image resolution on a sensor in such cases causes inaccurate tracking and measurement of displacement of an optical pointing device.

In an embodiment of the present invention, a laser (e.g. VCSEL) light source is used to illuminate surfaces, including surfaces such as manila folders and white paper that in turn would generate a speckle pattern on the sensor, i.e., a random variations of the intensity in the image plane. Using appropriate optics in accordance with the present invention, the speckle size can be similar to the pixel size (e.g. 60 um), and the contrast seen by the sensor can thus be very high (close to 100%).

In one embodiment, the appropriate optical system (including optics) uses optical homodyning, which is described as follows. In order to have a sufficient speckle size, a lens aperture is reduced compared to the conventional imaging systems. As a result, light intensity collected by the lens may be very low (e.g., at least 50 times lower to have a speckle size of 60 μm). To help address this, the generated speckle pattern may be mixed with a relatively high-power reference wave. The interference between the speckle pattern and the smooth reference wave will give rise to a new speckle pattern having sufficiently high quality contrast, but with an increased mean intensity. In other words, the speckle pattern is "boosted" in part from the interference with the reference wave.

Figure 9:
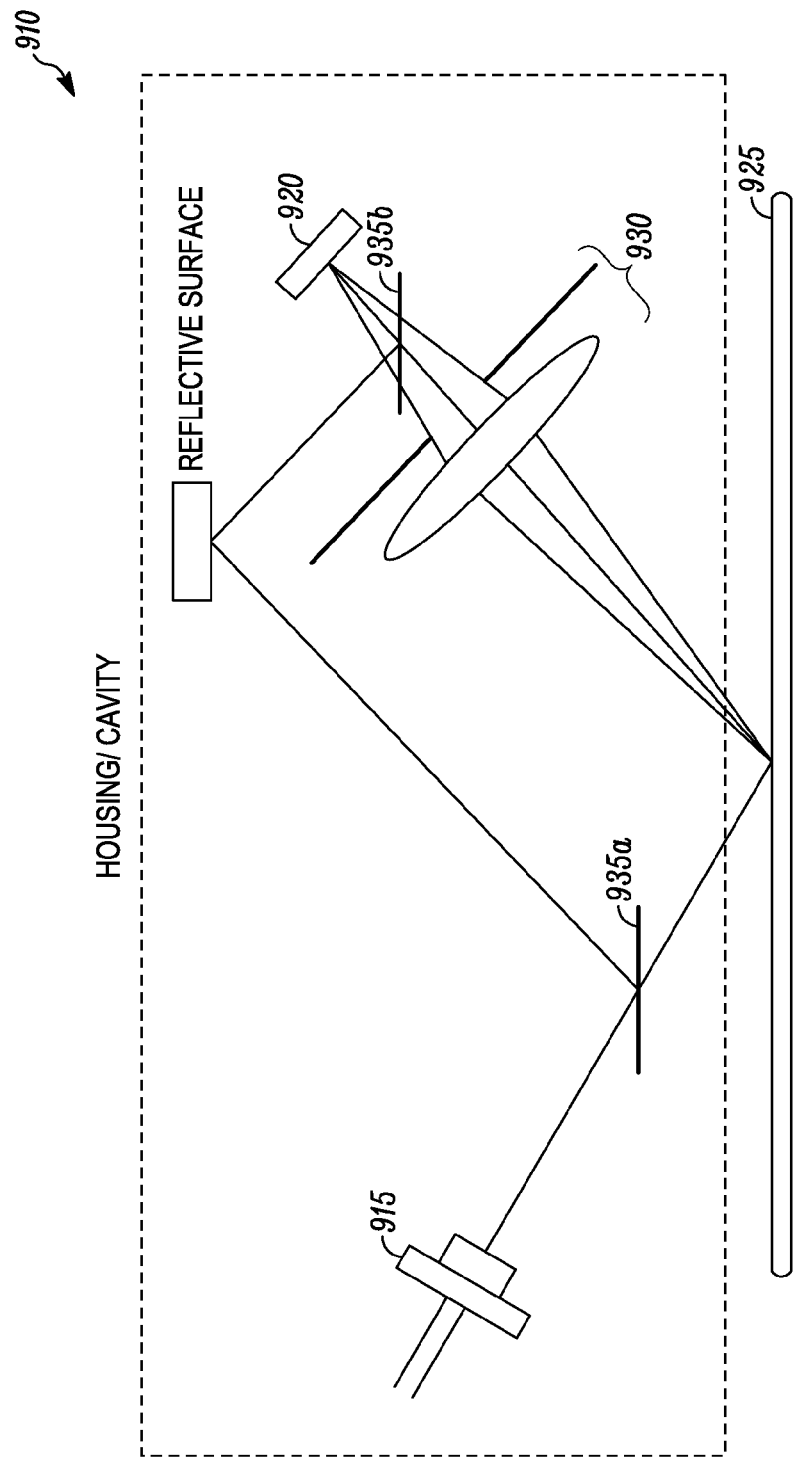
FIG. 9 illustrates one embodiment of an optical homodyning system in accordance with the present invention.

As an example, FIG. 9 illustrates one embodiment of an optical homodyning system 910 in accordance with the present invention. The figure illustrates one embodiment of a beam splitter principle. A small part (e.g., 1 μW) of the coherent light coming from a laser, e.g., a VCSEL 915, is directed directly towards the sensor 920, as an other high-power part (e.g., 1 mW) is used to illuminate the surface 925. Using an appropriate lens and aperture 930, a speckle pattern is generated in front of the sensor 920 with a speckle size equal to the pixel size. The speckle pattern is combined with the light coming directly from the VCSEL 915 by means of beam splitters 935a, 935b (generally 935). The coherent superposition of the two waves will give rise to a new speckle pattern. The mean intensity is given by:

$$I = I1 + I2,$$

where I1 and I2 are the mean intensity of the speckle pattern and the reference wave. The reference wave intensity generally is much higher than the speckle pattern. The mean intensity is therefore given by I2. The contrast will be given by $$C = 2 * \mathrm{sqrt}(I1 * I2)/(I1 + I2)$$

where the numerator 2*sqrt(I1*I2) results from the interference between I1 and I2. Assuming I2=10*I1, we see that we still have a contrast of about 60%, which is much higher than the contrast currently observed with grazing LED illumination.

Figure 10A:
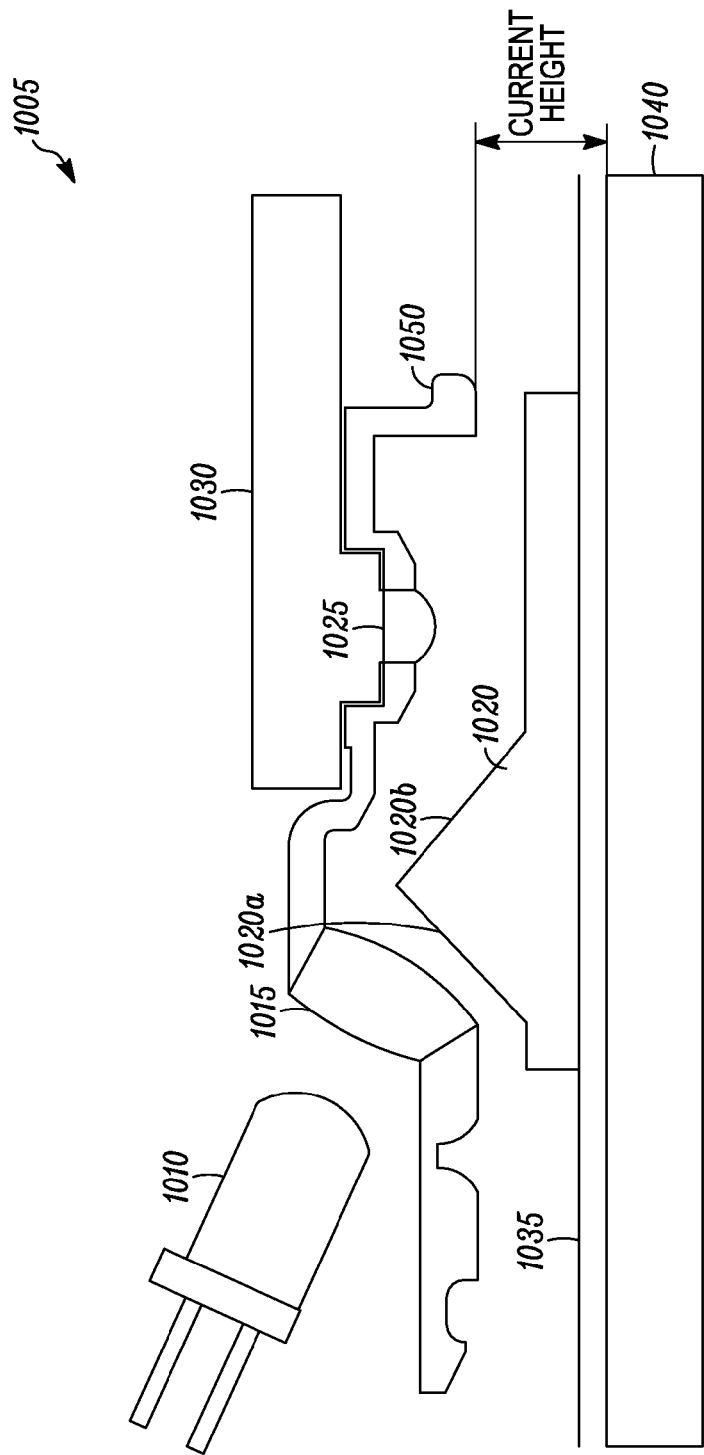
FIGS. 10a to 10c illustrate alternative structural embodiments of an optical system component configuration for structuring a continuous base optical pointing device in accordance with the present invention.
Figure 10B:
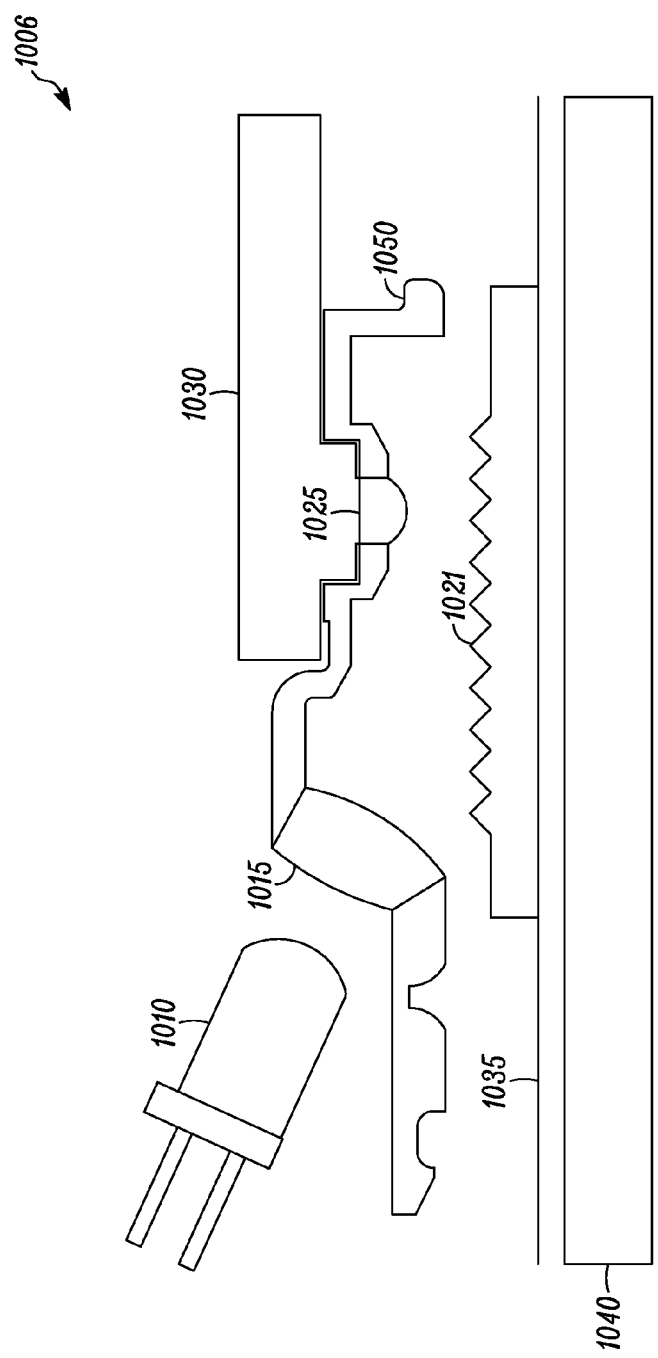
Figure 10C:
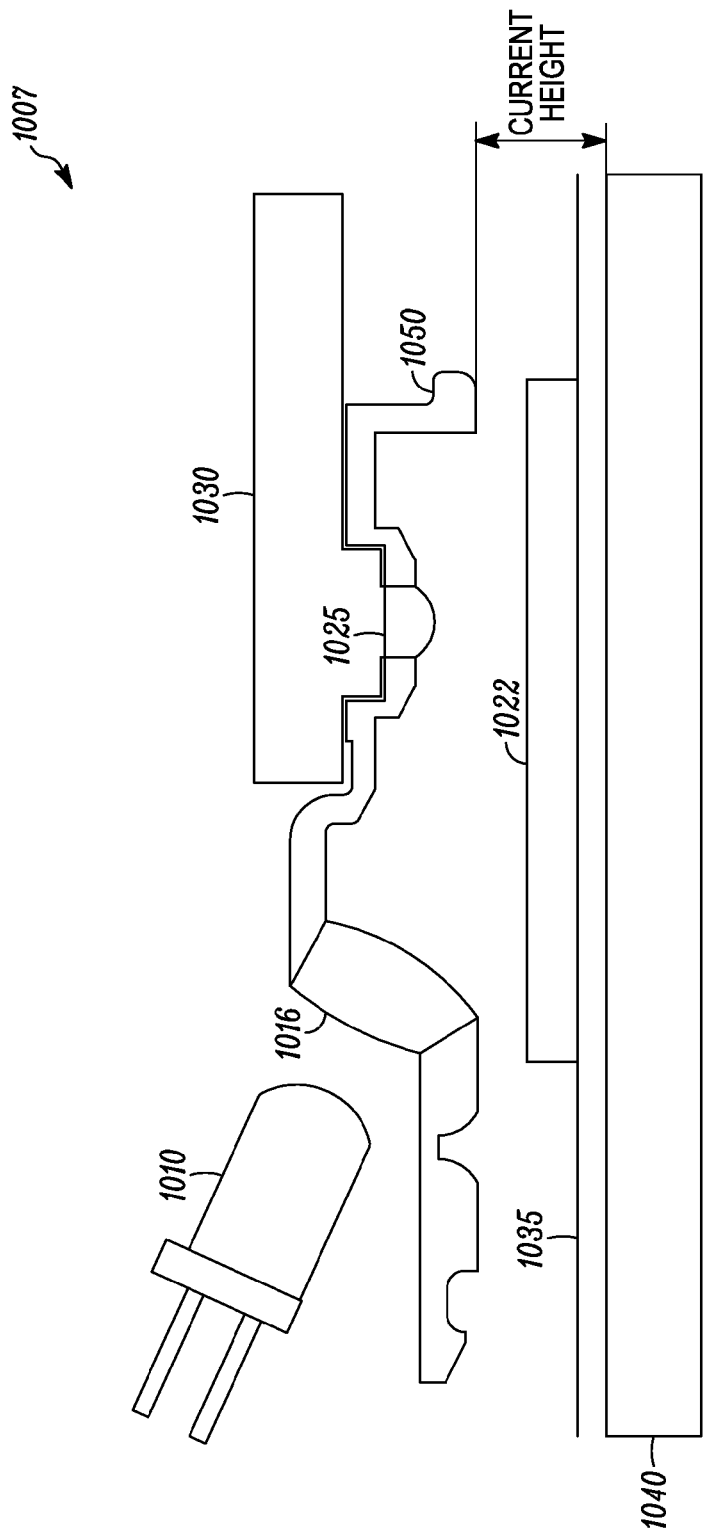

FIGS. 10a to 10c illustrate alternative structural embodiments of an optical system component configuration for structuring a continuous base optical pointing device in accordance with the present invention. The structures illustrated are configured within the optical point device using conventional components (not shown). Examples of illustrated embodiments include adding an optical function to keep system at a current height, adding or integrating microstructures into a window, or formulating a design for lens, e.g., the illumination and/or the imaging lens, to achieve desired optical characteristics as described above. In a first embodiment, a system 1005 includes a light source 1010, e.g., a VCSEL, an illumination lens 1015, a window 1020, an imaging lens 1025, and a sensor 1030. In this configuration, the illumination lens 1015 can be configured with convex surfaces that can be used to direct light from the light source 1010. In addition, the window 1020 in a base 1035 is configured to allow light to pass through a first angle 1020a to a surface 1040. The reflected light comes back through another angle 1020b of the window 1020 and onto an imaging lens 1025 and the sensor 1030. In the illustrated embodiment an optical function is beneficially added in order to keep the system structured at a current height relative to a lens assembly 1050 (the illumination lens 1015 and imaging lens 1025) and surface 1040. It is noted that the window 1020 can be flush with the base or slightly recessed relative to a base. Moreover the window 1020 may be a part of a unibody (e.g., injected) construction relative to the base (e.g., a continuous base).

FIG. 10b illustrates a second embodiment of a system 1006 that includes components similar to the first embodiment of the system 1005, but instead uses a window with microstructures 1021. This configuration functions in a manner that also allows for retention of a current height between the lens assembly 1050 and the surface 1040. The system 1007 illustrated in FIG. 10c includes components like the other two systems 1005, 1006, but in this embodiment, the window does not have any particular configuration (i.e., it is flat) and an illumination lens 1016 would be designed so that a convex design may have greater or lesser curvature depending on lens material used to appropriately shape the light from the light source 1010 in the direction of the surface 1040 through the window 1022.

Upon reading this disclosure, those of skill in the art will appreciate still additional alternative structural and functional designs for an optical control device configuration with a flush bottom or sealed bottom surface through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A control device configured for use on a surface, the control device detecting optical displacement relative to the surface, the control device comprising:
   a housing;
   a light source located within the housing for illumination a surface;
   an illumination lens located within the housing to direct light from the light source on to the surface;
   a sensor located within the housing to receive light scattered off the surface;
   a continuous bottom portion of a housing, the bottom portion having no openings, and including a window configured to allow light from the light source to be directed onto the surface and to allow reception of the scattered light on the sensor, wherein the window is raised off the surface, so as to prevent direct contact with the surface.

2. The control device of claim 1, wherein the window is recessed relative to a remainder of the bottom portion.

3. The control device of claim 1, wherein the bottom portion is raised using feet.

4. The control device of claim 1, wherein the window directs the light onto the surface.

5. The control device of claim 1, wherein the window directs at least a portion of the scattered light onto the sensor.

6. The control device of claim 1, wherein the window is plano-concave.

7. The control device of claim 1, wherein the window is plano-convex.

8. The control device of claim 1, further comprising:
   an imaging lens located between the window and the sensor, the imaging lens configured to focus at least a portion of the scattered light onto the sensor.

9. The control device of claim 1, wherein the sensor is one of a plurality of sensors.

10. The control device of claim 1, wherein the window is transparent and a remainder of the bottom portion is opaque.

11. The control device of claim 1, wherein the bottom portion further comprises:
    a first surface having an opening; and
    a second surface comprising the window, a perimeter of the second surface coupled with a perimeter of the opening of the first surface.

12. The control device of claim 11, wherein the second surface comprises a transparent surface.

13. The control device of claim 1, wherein the light source comprises one of a group consisting of a coherent light source and a non-coherent light source.

14. The control device of claim 1, where in the control device comprises an optical mouse.

15. The control device of claim 1, wherein the control device comprises a remote control.

16. A method for enclosing a cavity within an optical device for use on a surface, the method comprising:
    providing a light source for illuminating the surface;
    providing a sensor for receiving light scattered from the surface;
    enclosing a cavity containing the light source and sensor with a continuous base having no openings, the continuous base including a window which allows the light from the light source and the light scattered from the surface to pass through it, the continuous base preventing entry of foreign elements into the optical device; and
    preventing parasitic rays generated by the window from reaching the sensor.

17. The method of claim 16, wherein the step of preventing parasitic rays comprises:
    including a baffle within the control device to block the parasitic rays.

18. The method of claim 16, wherein the step of preventing parasitic rays comprises:
    reducing the size of an aperture placed between the scattered rays and the sensor.

19. The method of claim 16, wherein the step of preventing parasitic rays comprising:
    inserting a baffle to prevent parasitic rays from reaching the sensor.

20. The method of claim 16, wherein the step of preventing parasitic rays comprises:
    increasing a distance between the window and the surface.

21. A control device configured for use on a surface, the control device detecting optical displacement relative to the surface, the control device comprising:
    a housing;
    a light source located within the housing for illuminating a surface with an illumination beam;
    an illumination lens located within the housing to direct light from the illumination beam onto the surface;
    a sensor located within the housing to receive light scattered off the surface;
    a continuous bottom portion of the housing having no openings and including a window configured to allow light from the light source to be directed onto the surface and to allow reception of the scattered light on the sensor, wherein the window has active optical properties.

22. The control device of claim 21, wherein the active optical properties comprise homogenizing the illumination beam.

23. The control device of claim 21, wherein the active optical properties comprise redirecting the illumination beam.

24. The control device of claim 21, wherein the active optical properties comprise directing at least a portion of the scattered light on the sensor.

* * * * *